United States Patent
Dick et al.

[15] 3,698,630
[45] Oct. 17, 1972

[54] INSURANCE CALCULATOR

[72] Inventors: George W. Dick, Stamford, Conn.; Norman Diamond, Laurelton, N.Y.

[73] Assignee: Metropolitan Life Insurance Co., New York, N.Y.

[22] Filed: Dec. 16, 1970

[21] Appl. No.: 98,828

[52] U.S. Cl. .................................... 235/78, 235/84
[51] Int. Cl. .................................... G06g 1/08
[58] Field of Search ............... 235/78, 116, 84, 70 R

[56] References Cited

UNITED STATES PATENTS

| | | | |
|---|---|---|---|
| 1,962,866 | 6/1934 | Graham | 235/84 |
| 3,232,531 | 2/1966 | Hodge, Jr. | 235/70 R |
| 3,259,311 | 7/1966 | Sama et al. | 235/78 |
| 3,275,235 | 9/1966 | Balch | 235/84 |

*Primary Examiner*—Stephen J. Tomsky
*Attorney*—Lester W. Clark, Robert S. Dunham, P. E. Henninger, Thomas F. Moran, Gerald W. Griffin, R. Bradlee Boal, Christopher C. Dunham and Robert Scobey

[57] ABSTRACT

The calculator comprises a circular background disc having a logarithmic premium scale, and a foreground disc rotatable on the background disc and having a logarithmic amount of insurance scale adapted to cooperate with the premium scale. The background disc also has one or more concentric linear age scales observable through windows in the foreground disc. The foreground disc carries index lines cooperating with the age scales. Each age scale corresponds to a different plan of insurance. A sector shaped cursor is pivotally connected to the center of the background and foreground discs and is provided on its periphery with a period of time scale which cooperates with the premium scale to indicate the amount of premium required for selected time periods.

For more complex combinations of types of insurance, which consist essentially of a first amount of one type of insurance and a second amount of another type, with their corresponding premiums, the background scale is provided with a family of non-radial age curves which are viewable through a window on the foreground disc. The window has a radial line calibrated in terms of percentage, to indicate the percentage of the total insurance which must be carried in one particular type of insurance. The cursor also has on its periphery a percentage scale which cooperates with the amount of insurance scale to show the value of the percentage read off the radial line.

4 Claims, 8 Drawing Figures

PATENTED OCT 17 1972
3,698,630
SHEET 1 OF 3
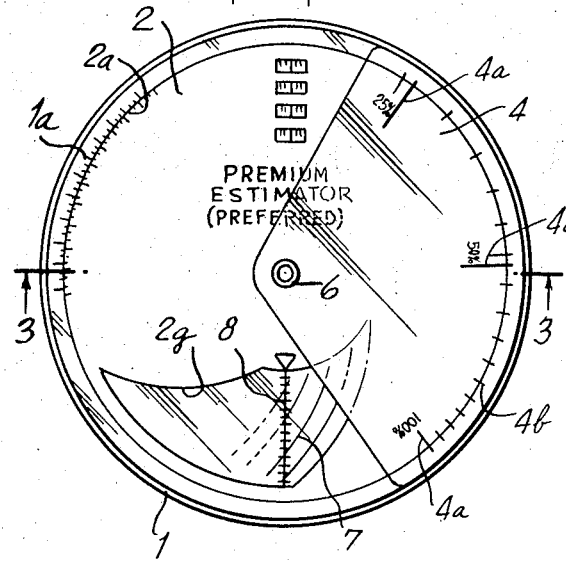
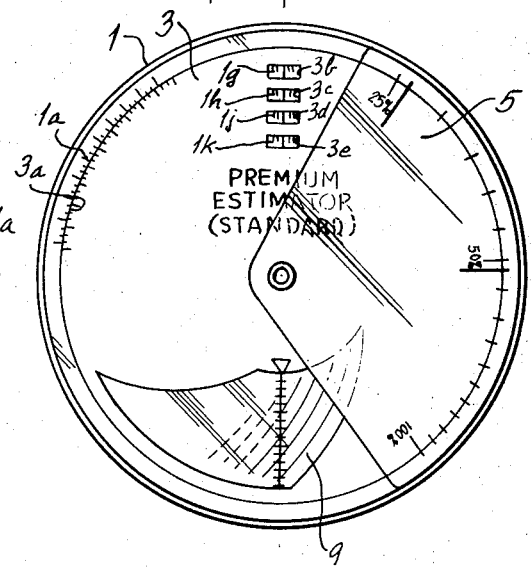
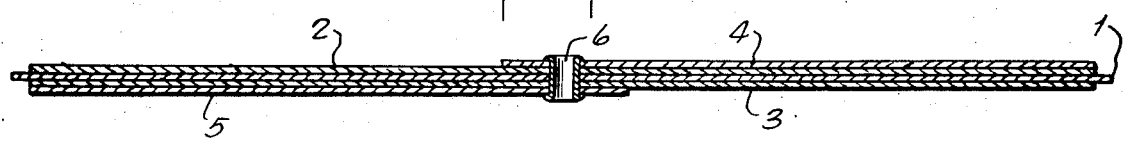
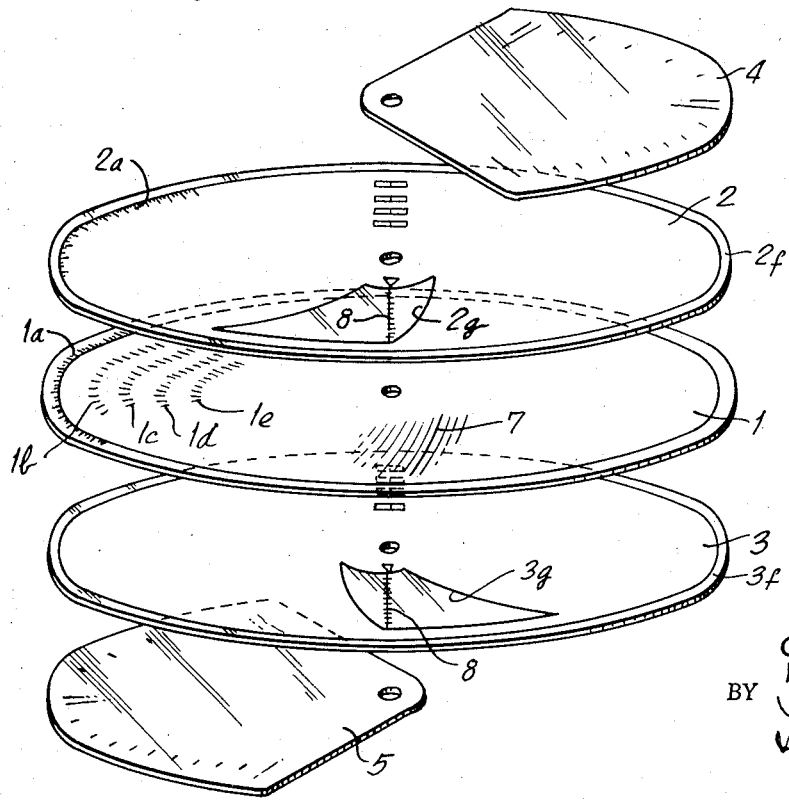
INVENTORS
GEORGE W. DICK
NORMAN DIAMOND
BY Lester N. Clark
ATTORNEY

INSURANCE CALCULATOR

BRIEF SUMMARY OF THE INVENTION

It is customary for insurance agents and underwriters to determine rates by the use of a rate book. For complex insurance plans, the use of a rate book is a trial and error process.

The calculator of the present invention allows the agent to give the client close approximations based on a single setting of the calculator for each type of insurance involved. A single calculator may provide estimated rates for several different types of simple insurance and for a complex type of insurance which essentially is a combination of two different types.

The calculator has a background disc carrying a peripheral premium scale and a plurality of concentric age scales, one age scale for each of several different types of simple insurance, and a foreground disc having a peripheral scale calibrated in amount of insurance and cooperating with the premium scales on the background disc. The foreground disc also has a plurality of windows, each with an index, for cooperation with one of the age scales. A cursor is provided for facilitating the alignment of figures on the premium and insurance scales. The cursor also has a period of time scale for allowing the agent to read off annual, semiannual or quarterly premiums from the premium scale.

For complex insurance plans, which may, for example, be a combination of whole life insurance and term insurance, the background scale is provided with a family of non-radial age curves, and the foreground scale is provided with a radial line cooperating with those age curves and calibrated in percentage to indicate for each age, what percent of the total insurance must be whole life insurance. The cursor is provided on its periphery with a percentage scale which enables the user to read from the insurance amount scale the dollar value of the whole life insurance whose percentage has been determined from the percentage scale.

DRAWINGS

FIG. 1 is a plan view of a calculator constructed in accordance with the invention, with the calibration of the principal scales shown only partially.

FIG. 2 is a bottom view of the calculator of FIG. 1, showing that it is duplex in that two separate calculators are provided on opposite sides of a single background disc.

FIG. 3 is a cross-sectional view taken on the line 3—3 of FIG. 1.

FIG. 4 is an exploded perspective view showing the various discs of FIGS. 1 to 3 separated.

DETAILED DESCRIPTION

FIGS. 1–4

Figure 5:
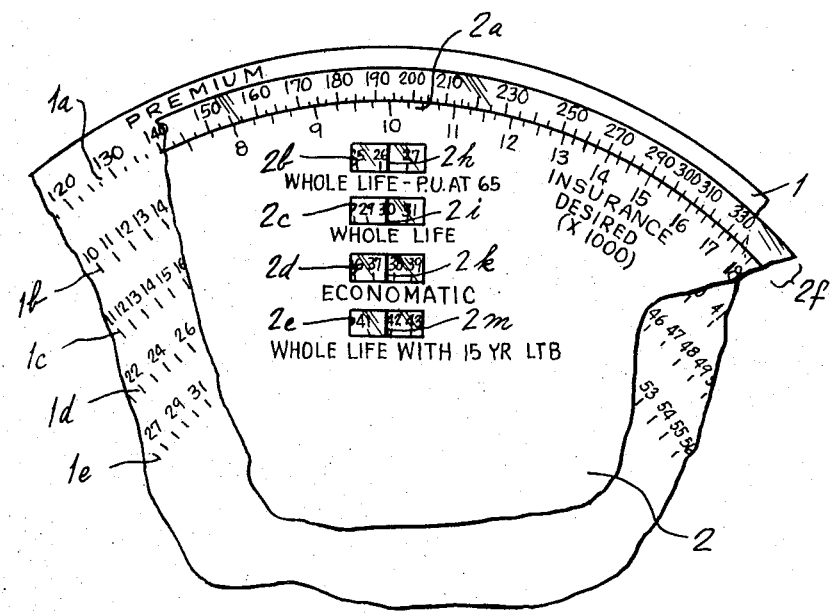
FIG. 5 is a fragmentary view showing portions of the scales in more detail and illustrating how the scales cooperate for the calculation of simple insurance.

The calculator illustrated comprises a single background disc 1, two foreground discs 2 and 3, and two cursors 4 and 5. The discs and cursors are held pivotally together by a central eyelet 6, so that any disc may be readily rotated on the eyelet. The background disc is somewhat larger in diameter than the foreground disc so that the normal method of operation is to hold the background disc by its periphery and rotate one foreground disc and its associated cursor as may be required. For any given estimation of a premium or policy amount, the background disc is used with only the foreground disc and the cursor on one side. It is never necessary to turn the calculator over during a single calculation. In the example illustrated, the discs 1 and 2 and the cursor 4 are used for calculating premiums for preferred risks. Discs 1 and 3 and the cursor 5 are used for calculating premiums for standard risks. For example, standard rates may be offered to male prospects for amounts of insurance below $25,000 and to female prospects for amounts below $5,000. Preferred rates, on the other hand, may be offered for amounts of $25,000 and above for males and $5,000 and above for females.

The disc 2 is for the most part opaque but is provided at its periphery with a transparent margin 2f, best seen in FIG. 5, whose purpose is to overlie the scale 1a on the background disc 1, to protect it from wear and from contact with the fingers of the user, which might cause the indicia on the scale 2 to deteriorate.

The background disc 1 is provided with a peripheral premium scale 1a, which is a conventional logarithmic scale, such as is commonly used on slide rules. Concentric with the scale 1 are four age scales 1b, 1c, 1d and 1e, best seen in FIG. 5. Adjacent the 6 o'clock position on the background scale, as viewed in FIG. 1, it is provided with a family of age curves 7.

The foreground disc 2 is provided adjacent its periphery with a scale 2a, which preferably is exactly the same in its numerical calibration as the scale 1a so that the cooperating scales 1a and 2a form a cooperating pair of logarithmic scales, as on a slide rule.

The foreground disc 2 is for the most part opaque, but is provided with a series of windows 2b, 2c, 2d and 2e, through which short portions of the age scales 1b, 1c, 1d and 1e may respectively be observed. Each of the windows 2b, 2c, 2d and 2e is provided with an index line to facilitate accurate reading of the scale beneath it. The index lines for the windows 2b, 2c, 2d and 2e are respectively shown at 2h, 2i, 2k and 2m in FIG. 5.

Figure 7:
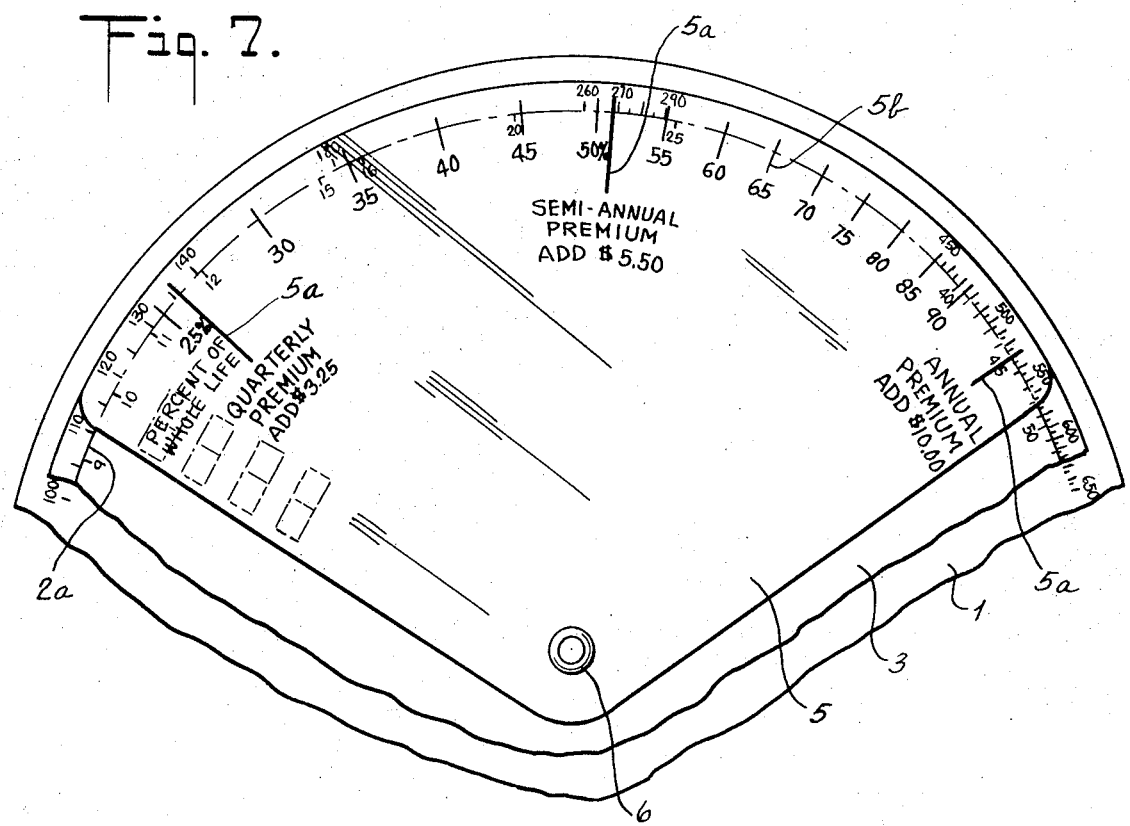
FIG. 7 is a fragmentary view similar to FIG. 6, but with the scales in a different relative position, to illustrate the use of the calculator with a complex insurance plan.

The disc 2 is also provided with a large window 2g through which a considerable part of the family of age curves 7 may be observed. A line 8 extends radially across the window 7 and is calibrated in terms of decimal ratios, as shown in FIG. 7, or alternatively in terms of percentage.

Figure 6:
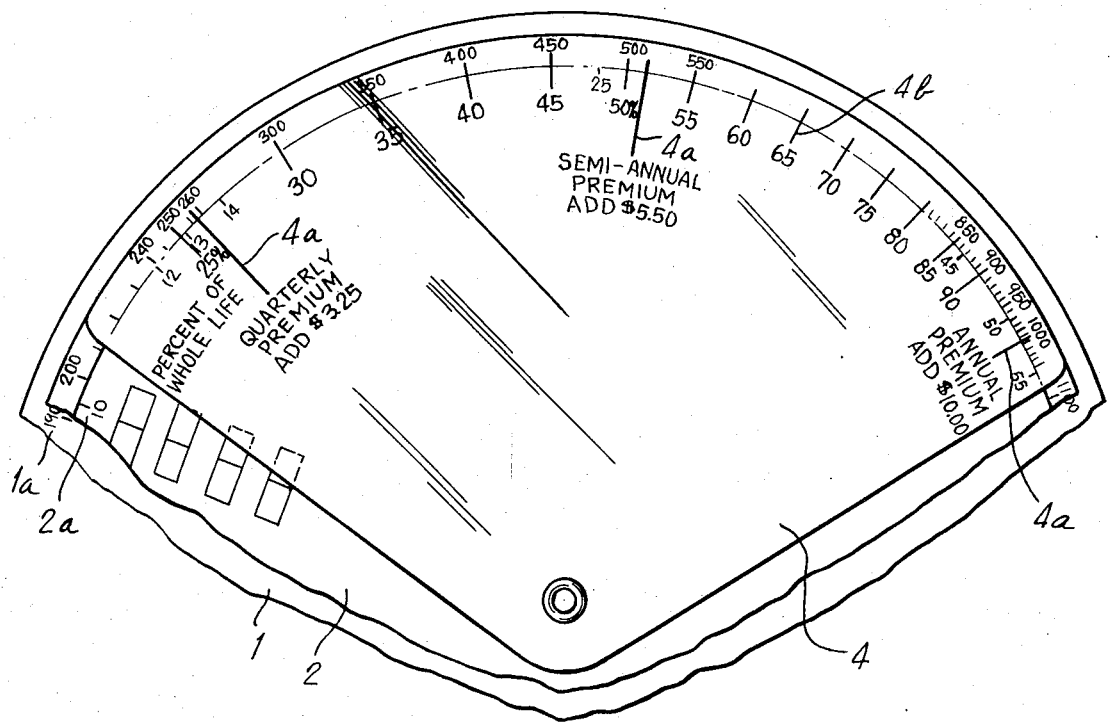
FIG. 6 is a fragmentary view similar to FIG. 5, with the scales in the same relative positions, but with the cursor added, to illustrate the use of the cursor.

The cursor 4 has two scales, 4a and 4b, best seen in FIG. 6. The scale 4a is a period of time scale having three index marks respectively indicating the annual premium, the semiannual premium and the quarterly premium. These marks cooperate with the premium scale and show the premiums corresponding to the respective periods of time, for the amount of insurance appearing under the annual premium index on the insurance amount scale 2a.

The second scale 4b on the cursor is calibrated in terms of percentage. The annual premium index is at the 100 percent position on this scale. The other indicia on this scale cooperate with the amount of insurance scale 2a.

The foreground disc 3 is the same as the foreground disc 2. The background disc 1 has on its under side a peripheral scale 1a, like the scale of the same number on its upper side, which cooperates with a scale 3a on the disc 3. The scale 3a is like the scale 2a on disc 2. The bottom side of the background disc 1 has age scales 1g, 1l, 1j, 1k, different from the age scales on the top side, and visible through windows 3b, 3c, 3d and 3e, respectively A family of age curves 9 on the under side of disc 1 is different from the family of age scales 7 on the top. The disc 3 has a window 3g with a scale 8, like the window 2g and scale 8 on disc 2. The cursors 4 and 5 may be exactly alike. Scale 5a corresponds to scale 4a and 5b to 4b.

OPERATION OF THE CALCULATOR

SIMPLE INSURANCE

When calculating simple insurance, the prospective client is expected to supply information as to his age, and either as to the amount of insurance that he wants or as to the amount of premium he can afford to pay. The various types of simple insurance correspond to the four age scales 1b, 1c, 1d, 1e on the background disc 1. Assume, for example, that the client gives his age as 30 and indicates that he wants whole life insurance. The foreground disc 2 is then rotated with respect to the background disc until the index line on the window 2c is aligned with the number 30. This sets the position of the foreground disc with respect to the background disc. When that setting is determined, then each value on the amount of insurance scale 2a appears opposite a figure on the premium scale 1a, which represents the amount of premium which will have to be paid for that particular amount of insurance. It is necessary first to select the appropriate side of the calculator, standard or preferred. For example, for $52,000 insurance, the preferred side (disc 2, cursor 4, and the top side of disc 1, as it appears in FIG. 4), would be used indicating an annual premium of $1,005 aligned with the required amount of insurance. See FIG. 6. To this premium must be added a policy fee of $10.00 making the total premium payable $1,015. This reading may be facilitated by using cursor 5, setting it in the angular position shown in FIG. 6, with the annual premium line aligned with the figure for $52,000 insurance. The same annual premium line is then aligned with the $1,005 figure on the premium scale. Whether the client gives the figure for the amount of insurance decided ($52,000) or whether he gives the figure for the amount available to pay as premiums ($1,015), the setting of the cursor 5 is the same, and a reading of the appropriate scale gives the corresponding figure.

The four age scales 1b, 1c, 1d and 1e, which are fixed with respect to the amount of insurance scale, indicate the relationship between the amount of insurance available for a given premium at a certain age, for four different types of insurance. For example, the scale 1b is marked "Whole Life Paid Up at 65". Since the age figures on this scale are lower than the radially opposite age figures on the "Whole Life Scale" 1c, it may be readily understood that the "Whole Life Paid Up at Age 65" insurance is more expensive for a person of given age than is the "Whole Life" insurance. The scales 1d and 1e are designed to indicate the premiums required for other types of insurance which are less expensive than Whole Life insurance. For any type of insurance, an appropriate age scale can be determined mathematically.

OPERATION — COMPLEX INSURANCE PLANS

FIGS. 7–8

Figure 8:
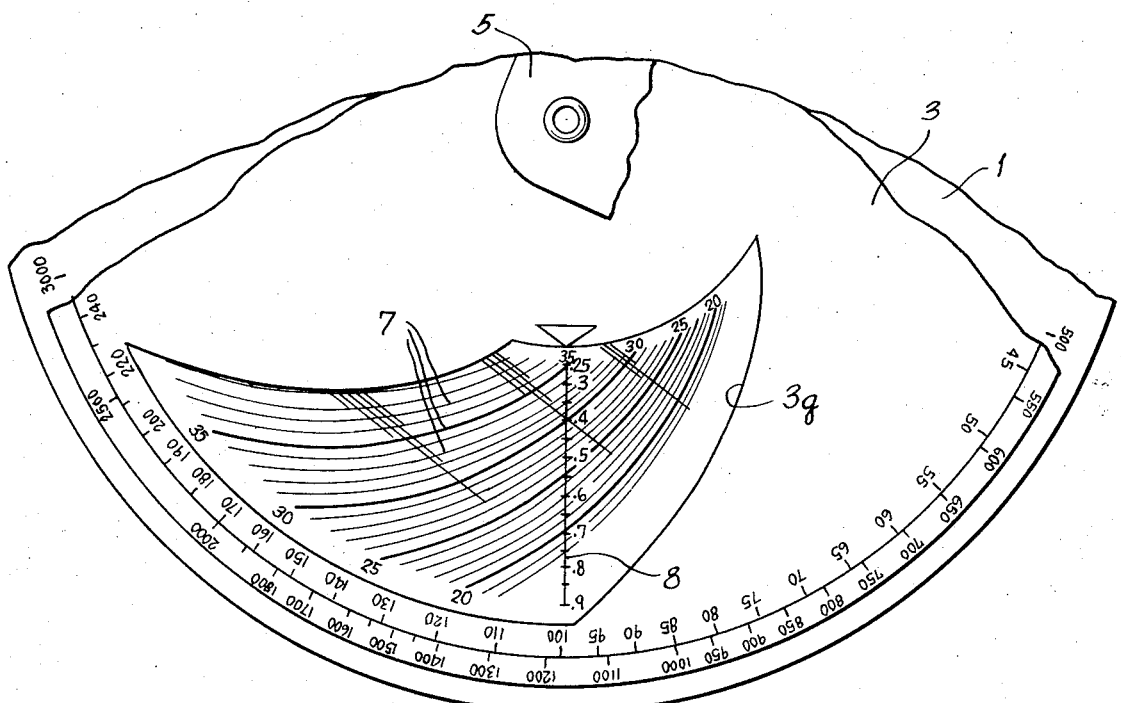
FIG. 8 is a fragmentary view, with the scales in the same relative positions as in FIG. 6, illustrating the use of the percentage scale and the family of age curves on the background scale to determine the makeup of a complex insurance plan.

This operation is described as applicable to a situation where a client wants to combine two plans of insurance. For example, he may wish to combine term insurance, which is the cheapest insurance available but which only continues for a fixed period, and Whole Life insurance, which continues throughout his lifetime but is considerably more expensive. Where such a combination is to be considered, the client usually has in mind both a figure for the amount of premium he wants to pay and another figure for the amount of insurance coverage that he needs. For example, assume that he wants to pay $550. annual premium for $45,000 insurance and his age is 32. The standard side of the calculator (disc 3, cursor 5, and the under side of disc 1, as it appears in FIG. 4), will be used in this example. Subtracting a $10.00 annual policy fee for each of the two plans of insurance leaves $530. as the total annual premium. The calculator is then set so that the $530. figure on the premium scale is opposite $45,000 on the insurance scale, and the cursor 4 is set so that the annual premium line is aligned with those two figures. See FIG. 7. Then, turning to FIG. 8, and the age line marked "32" in the family of curves 7, the point where the 32 year curve crosses the line 8 is noted, and is approximately 35 percent. Taking this figure on the percentage scale 4b, (FIG. 7) and reading on scale 2a, one finds that the whole life dollar amount is about $15,700. The balance of the $45,000 insurance, or $29,300 must then be term insurance.

The calculator of the present invention may be made of light plastic sheets on which the scales are printed. It is easily carried and manipulated, and facilitates discussions between an agent and a prospective client, in that it reduces the time required for the agent to present rough premium rates for several alternative plans, for the clients consideration.

The calculator has only slide rule accuracy, and does not supplant the rate book, but reduces the use of the rate book. Furthermore, in the case of complex plans, it enables the agent to reach quickly the proper table entry in the rate book, without going through a trial and error process.

The calculator of the invention is illustrated as a disc type, and the disc arrangement has many advantages, e.g., of compactness, for use in connection with the calculation of insurance premiums in accordance with the invention. Nevertheless, it is well known in the slide rule art that rectilinear scales are the equivalent of arcuate scales. It would be possible to construct a calculator having all the scales employed in the calculator of the invention, with the several elements moving rectilinearly with respect to each other, rather than moving pivotally.

We claim:

1. A calculator including:
   a. a background element having a first logarithmic scale extending for a substantial distance;
   b. a foreground element having a second logarithmic scale extending alongside the first scale;
   c. means connecting the background element and the foreground element for relative movement in a direction parallel to said scales;
   d. a transparent cursor with a third logarithmic scale extending over both the first and second scales, for selecting a position for the foreground element with respect to the background element, so as to establish, for each value on one of said first and second scales, a corresponding aligned value on the other of said first and second scales;
   e. said foreground element having a transparent window spaced transversely of said foreground element from said second scale, a line perpendicular to said second scale and extending across said window and a linear scale marked along said line;
   f. said background element having a family of curves thereon and spaced transversely of said background element from said first scale so as to be visible through said window, at least at certain positions of the foreground element with respect to the background element; and
   g. a fourth logarithmic scale on the cursor extending in the same direction as said first and second scales and corresponding in calibration to the scale on the perpendicular line.

2. A calculator including:
   a. a background disc having a first logarithmic scale extending around its peripheral margin;
   b. a foreground disc having a second logarithmic scale having a radius less than that of the first scale; and
   c. means pivotally concentrically connecting the background disc and the foreground disc; and
   d. a transparent cursor pivotally mounted on said pivotally connecting means and having a third logarithmic scale cooperating with said first and second scales;
   e. said foreground disc having a transparent window within said second scale, a radial line extending across said window and a linear scale marked along said line;
   f. said background disc having a family of non-radial curves thereon and located radially within the second scale; and
   g. a fourth logarithmic scale on the cursor corresponding to the scale on the radial line, and cooperating with said first and second scales.

3. An insurance calculator, including:
   a. a background disc having a first logarithmic scale extending around its peripheral margin;
   b. a foreground disc having a second logarithmic scale extending around its peripheral margin and cooperating with said first scale;
   c. means pivotally connecting the two discs;
   d. one of said scales being calibrated in terms of insurance premiums and the other said scales being calibrated in terms of amounts of insurance; and
   e. a cursor pivoted on said connecting means and having a peripheral logarithmic time period scale cooperating with said premium scale;
   f. said background scale has a family of non-radial curves located radially within the premium scale;
   g. said foreground disc has a window through which said family of curves may be observed and a radial line crossing said curves and having a scale linearly calibrated in terms of percentage; and
   h. said cursor has a logarithmic peripheral percentage scale cooperating with the amount of insurance scale.

4. An insurance premium calculator, including:
   a. a background disc having peripheral logarithmic premium scales on both sides of the disc;
   b. two foreground discs each with a peripheral logarithmic insurance amount scale, one on each side of the background disc;
   c. means pivotally concentrically connecting the background disc and the foreground discs;
   d. at least two concentric linear age scales, at least one on each side of the background disc;
   e. indices on each of the two foreground discs cooperating with said age scales;
   f. two cursors pivotally mounted on said connecting means and cooperating with said discs;
   g. two windows in the foreground discs, each with a radial line having a scale calibrated linearly in terms of percentage;
   h. two families of age curves, extending non-radially on the background disc and cooperating with said radial line on the foreground disc;
   i. two percentage logarithmic scales on the cursors cooperating with the logarithmic insurance scales on the foreground disc.

* * * * *